US012570082B2

(12) United States Patent
Luo et al.

(10) Patent No.: US 12,570,082 B2
(45) Date of Patent: Mar. 10, 2026

(54) CURVED SURFACE LENS LAMINATING FIXTURE AND CURVED SURFACE LENS LAMINATING SYSTEM

(71) Applicants: Interface Technology (ChengDu) Co., Ltd., Sichuan (CN); Interface Optoelectronics (ShenZhen) Co., Ltd., Guangdong (CN); General Interface Solution Limited, Miaoli County (TW)

(72) Inventors: Jyun-Yi Luo, Miaoli County (TW); Po-Lun Chen, Miaoli County (TW); Yun-Pei Chen, Miaoli County (TW)

(73) Assignees: INTERFACE OPTOELECTRONICS (SHENZHEN) CO., LTD., Shenzhen (CN); INTERFACE OPTOELECTRONICS (WUXI) CO., LTD., Wuxi (CN); GENERAL INTERFACE SOLUTION LIMITED, Miaoli County (TW)

( * ) Notice: Subject to any disclaimer, the term of this patent is extended or adjusted under 35 U.S.C. 154(b) by 145 days.

(21) Appl. No.: 18/374,050

(22) Filed: Sep. 28, 2023

(65) Prior Publication Data

US 2025/0033342 A1      Jan. 30, 2025

(30) Foreign Application Priority Data

Jul. 24, 2023    (CN) .......................... 202310914166.3

(51) Int. Cl.
| | |
|---|---|
| *B32B 37/10* | (2006.01) |
| *B32B 1/00* | (2024.01) |
| *B32B 37/24* | (2006.01) |
| *G02F 1/1337* | (2006.01) |
| *G02F 1/1341* | (2006.01) |

(52) U.S. Cl.
CPC ............ *B32B 37/1018* (2013.01); *B32B 1/00* (2013.01); *B32B 37/24* (2013.01); *G02F 1/133723* (2013.01); *G02F 1/13415* (2021.01); *B32B 2037/243* (2013.01); *B32B 2255/26* (2013.01);
(Continued)

(58) Field of Classification Search
CPC ....... B32B 37/1018; B32B 1/00; B32B 37/24; B32B 2037/243; B32B 2255/26; B32B 2379/08; B32B 2551/00; G02F 1/133723; G02F 1/13415; G02F 1/1303; G02F 1/133526; G02F 1/1341; G02B 7/02; G02B 3/00; G02B 3/12; G02B 7/025
See application file for complete search history.

(56) References Cited

FOREIGN PATENT DOCUMENTS

| | | | | | |
|---|---|---|---|---|---|
| CN | 107238957 A | * | 10/2017 | .......... | G02F 1/1303 |
| CN | 110978738 A | * | 4/2020 | ............. | B32B 37/10 |

(Continued)

*Primary Examiner* — Christopher W Raimund
(74) *Attorney, Agent, or Firm* — Troutman Pepper Locke LLP; Tim Tingkang Xia, Esq.

(57) ABSTRACT

Disclosed is a curved surface lens laminating fixture, comprising: a first cavity housing a detachable first laminating component, and a second cavity accommodating a detachable second laminating component. The first cavity has a plurality of detachable locking components and one or more optical scale. The first cavity is connected to a vacuum device and can form a vacuum state by the vacuum device. The second cavity has a plurality of grooves corresponding to the locking components. The second cavity is connected to the vacuum device and can form a vacuum state by the vacuum device.

3 Claims, 5 Drawing Sheets

(52) U.S. Cl.
CPC ....... *B32B 2379/08* (2013.01); *B32B 2551/00*
(2013.01)

(56) References Cited

FOREIGN PATENT DOCUMENTS

| CN | 212690533 U | * | 3/2021 | |
| WO | WO-2017219449 A1 | * | 12/2017 | .............. B23P 19/02 |

\* cited by examiner

S41

410

400

S42

420

410

400

S43

410

430

CURVED SURFACE LENS LAMINATING FIXTURE AND CURVED SURFACE LENS LAMINATING SYSTEM

CROSS-REFERENCE TO RELATED APPLICATION

This application claims the benefit of China Patent Application No. 202310914166.3, filed on Jul. 24, 2023, which is incorporated by reference herein in its entirety.

FIELD OF THE INVENTION

The present invention relates to a curved surface lens laminating fixture, in particular to a curved surface lens laminating fixture and curved surface lens laminating system capable of eliminating the problems of assembly tolerances and liquid crystal perfusion bubbles, thus improving the uniformity of the gap.

BACKGROUND OF THE INVENTION

In traditional curved surface lens lamination technology, two substrates are utilized for the assembly process when making a planar or curved twisted nematic liquid crystal cell (TN cell) and a passive lens. Precise alignment accuracy is desired so as to ensure that no errors are caused during the subsequent laminating process.

In the prior art, for example, the assembly process under the atmosphere usually uses the traditional injection process in which small bubbles generate easily when injecting liquid crystals. Alternatively, performing the alignment under non-uniform pressure may cause a mura (unevenness) phenomenon due to non-uniform cell gaps.

Therefore, providing a curved surface lens laminating fixture and a curved surface lens laminating system that can solve the above problems is desirable in the industry.

SUMMARY OF THE INVENTION

The first object of the present invention is to provide a curved surface lens laminating fixture, comprising:

a first cavity accommodating a detachable first laminating component, wherein the first cavity has a plurality of detachable locking components and one or more optical scales, each of the plurality of detachable locking components extends from outside of the first cavity toward inside of the first cavity to form a protrusion, and the first cavity is connected to a vacuum device serving to form a vacuum state in the first cavity; and a second cavity accommodating a detachable second laminating component, wherein the second cavity has a plurality of grooves, each of the plurality of grooves corresponds corresponding to the protrusion of a respective one of the plurality of detachable locking components, and the second cavity is connected to the vacuum device serving to form a vacuum state in the second cavity.

In one embodiment of the invention, the locking components are capable of moving in the corresponding grooves to make the first cavity approach or move away from the second cavity.

In one embodiment of the invention, the locking components are arranged in a peripheral area of the first cavity.

In one embodiment of the invention, the one or more optical scales are arranged in a central area of the first cavity.

In one embodiment of the invention, the curved surface lens laminating fixture is capable of performing a liquid-crystal-one-drop-filling process.

In one embodiment of the invention, the one or more optical scales are capable of moving in the vertical direction, so that a first curved surface lens held on the first laminating component approaches or moves away from a second curved surface lens held on the second laminating component.

In one embodiment of the invention, the first laminating component is capable of acting independently while being separated from the first cavity; the second laminating component is capable of acting independently while being separated from the second cavity.

The second object of the present invention is to provide a curved surface lens laminating system, comprising:

one or more pre-processing units, providing a first curved surface lens and a second curved surface lens that are processed; and a curved surface lens laminating fixture, comprising: a first cavity accommodating a detachable first laminating component, wherein the first cavity has a plurality of detachable locking components and one or more optical scales, each of the plurality of detachable locking components extends from outside of the first cavity toward inside of the first cavity to form a protrusion, and the first cavity is connected to a vacuum device serving to form a vacuum state in the first cavity; and a second cavity accommodating a detachable second laminating component, wherein the second cavity has a plurality of grooves, each of the plurality of grooves corresponds to the protrusion of a respective one of the plurality of detachable locking components, and the second cavity is connected to the vacuum device serving to form a vacuum state in the second cavity;

wherein the curved surface lens laminating fixture is capable of performing a liquid-crystal-one-drop-filling process.

In one embodiment of the invention, the one or more pre-processing units respectively coat polyimide (PI) on a first optical substrate and a second optical substrate and perform an alignment process to form the first curved surface lens and the second curved surface lens.

The third object of the present invention is to provide a curved surface lens laminating system, comprising:

one or more pre-processing units, providing a first curved surface lens and a second curved surface lens that are processed; and a curved surface lens laminating fixture, comprising:

a first cavity accommodating a detachable first laminating component, wherein the first cavity has a plurality of detachable locking components and one or more optical scales, each of the plurality of detachable locking components extends from outside of the first cavity toward inside of the first cavity to form a protrusion, and the first cavity is connected to a vacuum device serving to form a vacuum state in the first cavity; and a second cavity accommodating a detachable second laminating component, wherein the second cavity has a plurality of grooves, each of the plurality of grooves corresponds to the protrusion of a respective one of the plurality of detachable locking components, and the second cavity is connected to the vacuum device serving to form a vacuum state in the second cavity;

wherein the curved surface lens laminating fixture is capable of performing a liquid-crystal-one-drop-filling process;

wherein the one or more pre-processing units respectively coat polyimide (PI) on a first optical substrate and a second optical substrate and perform an alignment process to form the first curved surface lens and the second curved surface lens;

wherein the locking components are capable of moving in the corresponding grooves to make the first cavity approach or move away from the second cavity;

wherein the locking components are arranged in a peripheral area of the first cavity;

wherein the one or more optical scales are arranged in a central area of the first cavity;

wherein the one or more optical scales are capable of moving in the vertical direction, so that a first curved surface lens held on the first laminating component approaches or moves away from a second curved surface lens held on the second laminating component;

wherein the first laminating component is capable of acting independently while being separated from the first cavity; the second laminating component is capable of acting independently while being separated from the second cavity.

Embodiments of the present invention will now be described, by way of example only, with reference to the accompanying drawings.

BRIEF DESCRIPTION OF THE DRAWINGS

The technical solutions of the present invention will be further described in detail below in conjunction with the drawings and embodiments. However, it should be understood that the drawings are designed merely for illustrative purpose and are intended only to conceptually explain the configurations described herein. It is unnecessary to draw the drawings in proportion.

DETAILED DESCRIPTION OF THE PREFERRED EMBODIMENTS

While certain embodiments are described, these embodiments are presented by way of example only, and are not intended to limit the scope of protection. The apparatuses, methods, and systems described herein may be embodied in a variety of other forms. Furthermore, various omissions, substitutions, and changes in the form of the example methods and systems described herein may be made without departing from the scope of protection.

First of all, it should be noted that, compared with the prior art, the curved surface lens laminating fixture and the curved surface lens laminating system in an exemplary embodiment of the present invention mainly utilize a liquid-crystal-one-drop-filling process directly in the fixture, thereby solving the aforementioned problems such as small bubbles and mura caused in the traditional injection process.

Exemplary embodiments of the present invention will be illustrated in detail with reference to the drawings as follows.

Figure 1:
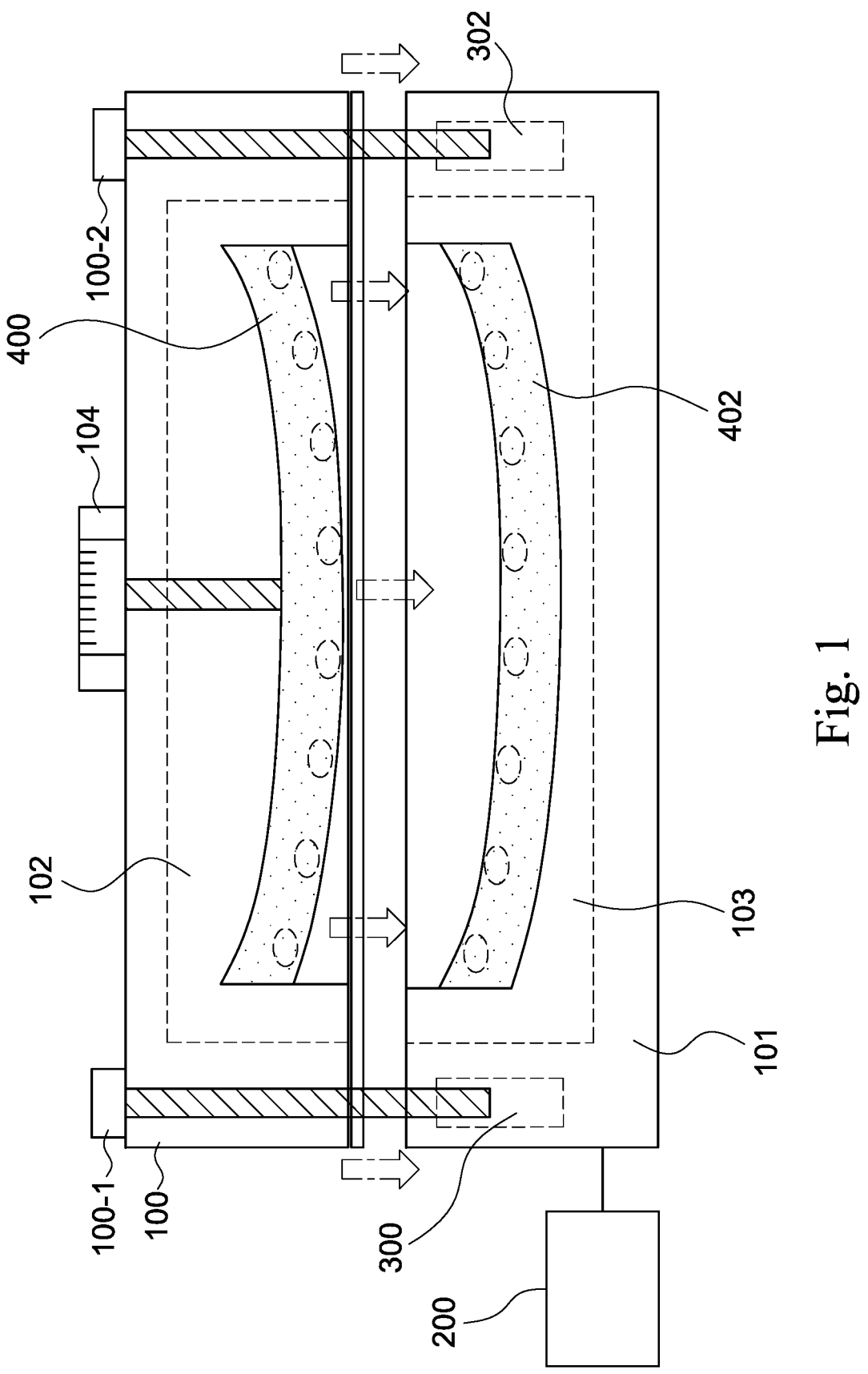
FIG. 1 depicts a schematic diagram of a curved surface lens laminating fixture according to an embodiment of the present invention.

First of all, FIG. 1 depicts a schematic diagram of a curved surface lens laminating fixture according to an embodiment of the present invention. As shown in FIG. 1, the curved surface lens laminating fixture according to an exemplary embodiment of the present invention at least includes a first cavity 100, a second cavity 101, a locking component 100-1, a locking component 100-2, a first laminating component 102, a second laminating component 103, an optical ruler 104 and a vacuum device 200. In other exemplary embodiments of the present invention, the number and position of the locking components may be adjusted according to design requirements. Additionally, in other exemplary embodiments of the present invention, the number and position of the optical scale can also be adjusted according to design requirements.

As shown in FIG. 1, the first cavity 100 accommodates a detachable first laminating component 102 and has a plurality of detachable locking components (100-1, 100-2) and one or more optical scales 104. It is noted that one optical scale 104 is embodied here. The first cavity 100 is connected to a vacuum device 200 so that the vacuum device 200 can form a vacuum state in the first cavity 102. In addition, a second cavity 101 accommodates a detachable second laminating component 103 and has a plurality of grooves (300, 302) corresponding to the locking components (100-1, 100-2). The second cavity 101 is connected to the vacuum device 200 so that the vacuum device 200 can form a vacuum state in the second cavity 101. In an exemplary embodiment of the present invention, the locking components (100-1, 100-2) are capable of moving in the corresponding grooves (300, 302) to make the first cavity 100 approach or move away from the second cavity 101. In an exemplary embodiment of the present invention, the locking components (100-1, 100-2) are arranged in a peripheral area of the first cavity 100. The one or more optical scales 104 are arranged in a central area of the first cavity 100. In an exemplary embodiment of the present invention, the curved surface lens laminating fixture is capable of performing a liquid-crystal-one-drop-filling process. In an exemplary embodiment of the present invention, the optical scale 104 is capable of moving in the vertical direction, so that a first curved surface lens 400 held on the first laminating component 102 approaches or moves away from a second curved surface lens 402 held on the second laminating component 103. In an exemplary embodiment of the present invention, the first laminating component 102 is capable of acting independently while being separated from the first cavity 100, and the second laminating component 103 is capable of acting independently while being separated from the second cavity 101. It is specially noted that the one or more pre-processing units are configured to provide a first curved surface lens 400 and a second curved surface lens 402.

Figure 2:
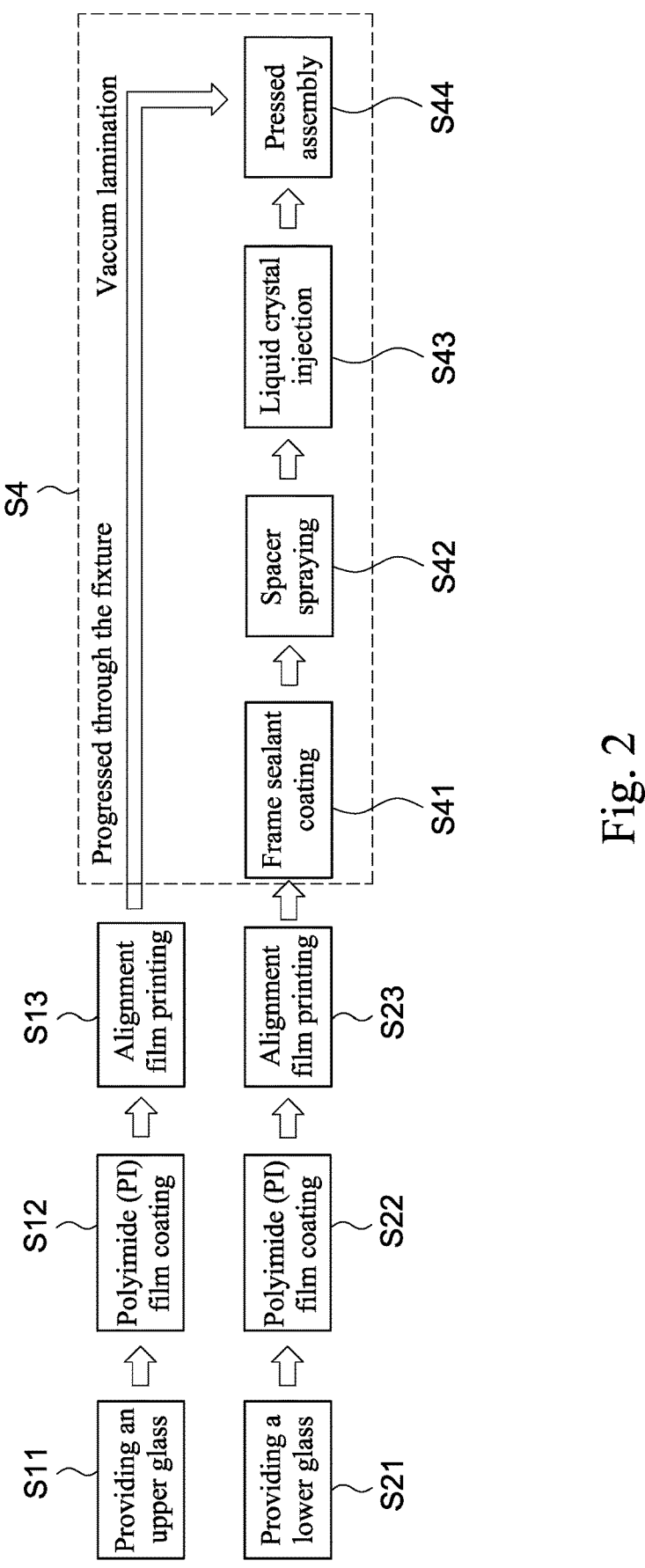
FIG. 2 depicts a flow chart illustrating the process flow of the curved surface lens laminating system according to an embodiment of the present invention.

Referring to FIG. 2, FIG. 2 depicts a flow chart illustrating the process flow of the curved surface lens laminating system according to an embodiment of the present invention. As shown in FIG. 2, the fabrication methods of the aforementioned processed first curved surface lens 400 and second curved surface lens 402 are described as follows.

In steps S11 and S21, clean upper glass and lower glass are provided, respectively. It should be noted here that steps S11 and S21 can be performed at the same time or in any order. In an exemplary embodiment of the present invention, the upper glass is, for example, an optical substrate (hereinafter referred to as "first optical substrate"), and the lower glass is, for example, an optical substrate (hereinafter referred to as "second optical substrate").

In steps S12 and S22, polyimide (PI) is coated on the first optical substrate and a second optical substrate from steps S11 and S21, respectively. It should be particularly noted here that steps S12 and S22 can be performed simultaneously or in any order.

In steps S13 and S23, an alignment process is performed on the first optical substrate and the second optical substrate from steps S12 and S22, respectively, thereby forming the aforementioned first curved surface lens 400 and second curved surface lens 402.

It should be particularly noted here that in step S4, in the above-mentioned curved surface lens laminating fixture shown in FIG. 1, a liquid-crystal-one-drop-filling process is respectively performed on the first curved surface lens 400 and the second curved surface lens 402 from the steps S13 and S23. That is to say, the step S41 (i.e., frame sealant coating step), the step S42 (i.e., spacer spraying step), and the step S43 (i.e., liquid crystal injection step) are performed on the first curved surface lens 400 and the second curved surface lens 402, respectively. Finally, the step 44 (i.e., pressed assembly step) is performed to carry out a vacuum press to the first curved surface lens 400 and the second curved surface lens 402.

Figure 3:
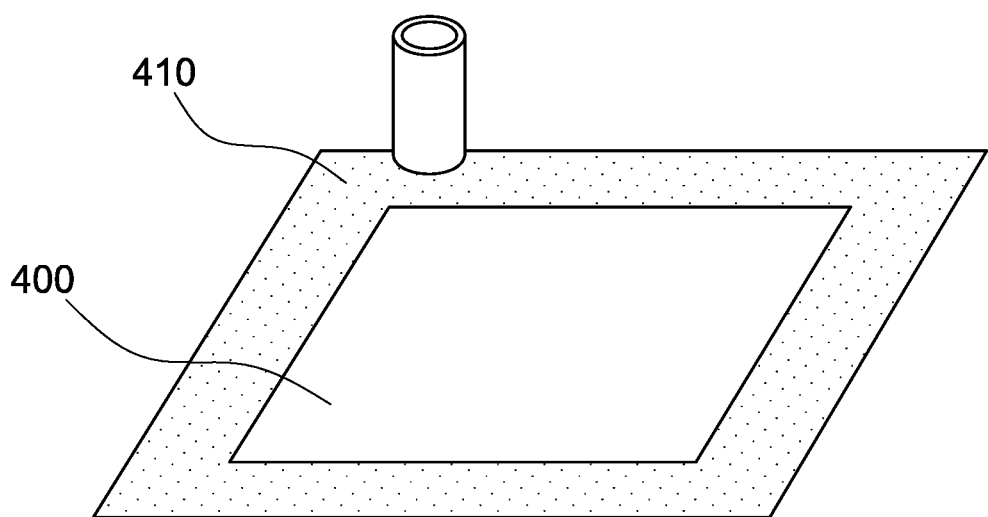
FIG. 3 depicts a schematic diagram showing the process of coating the sealant in FIG. 2.

Referring to FIG. 3, FIG. 3 depicts a schematic diagram showing the process of coating the sealant in FIG. 2. As shown in FIG. 3, in the frame sealant coating step (i.e., step S41), the pre-treated first curved surface lens 400 and second curved surface lens 402 (here, the figure only shows reference number 400 as an example) are coated with adhesive 410 on the peripheral area of the surface that is bonded to each other.

Figure 4:
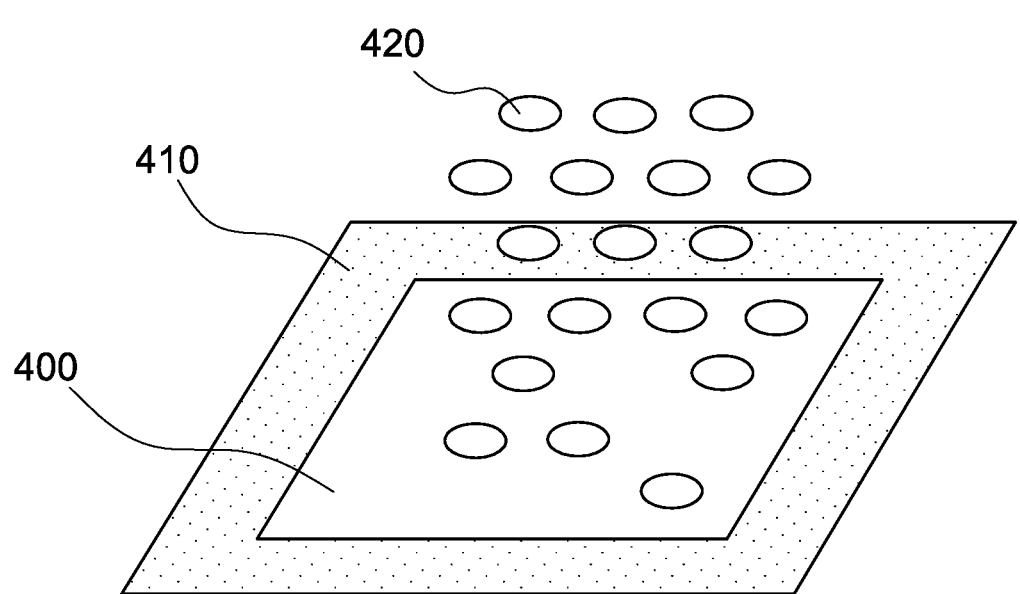
FIG. 4 depicts a schematic diagram showing the manufacturing process of spacer spraying in FIG. 2.

Referring to FIG. 4, FIG. 4 depicts a schematic diagram showing the manufacturing process of spacer spraying in FIG. 2. In the spacer spraying step (i.e., the step S42), the display area (non-peripheral area) of the surface where the first curved surface lens 400 and the second curved surface lens 402 (here, the figure is only an example of reference number 400) facing each other is further coated with spacer 420 through a spray coating process.

Figure 5:
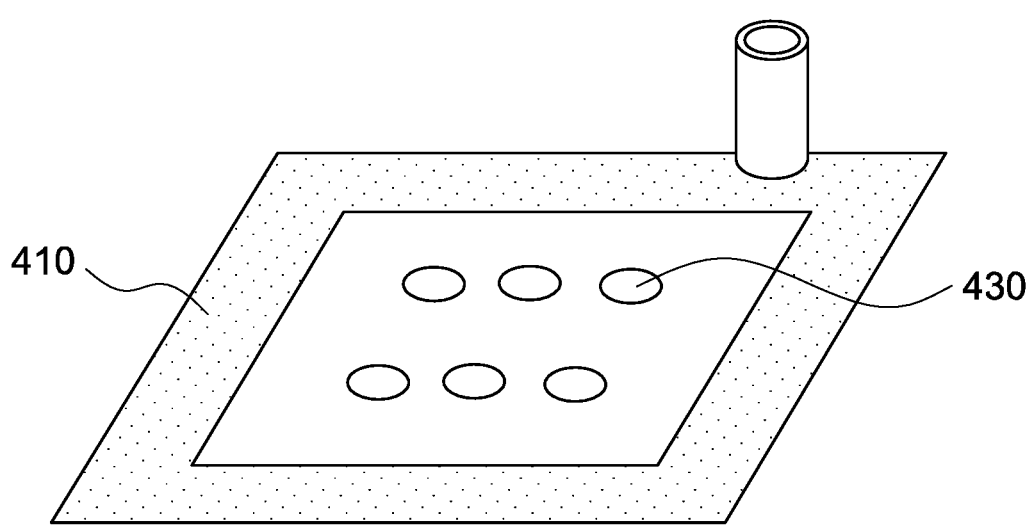
FIG. 5 depicts a schematic diagram illustrating the liquid crystal pouring process in FIG. 2.

Referring to FIG. 5, FIG. 5 depicts a schematic diagram illustrating the liquid crystal pouring process in FIG. 2. In the liquid crystal injection step (i.e., the step S43), a liquid-crystal-one-drop-filling process 430 is further performed on the display area (non-peripheral area) of the surfaces where the first curved surface lens 400 and the second curved surface lens 402 (here, only reference number 400 is shown in the figure) face to each other. Finally, the pressed assembly step (i.e., the step 44) is performed to carry out a vacuum-press to the first curved surface lens 400 and the second curved surface lens 402.

In a second aspect of the present invention, a curved surface lens laminating fixture comprises a first cavity accommodating a detachable first laminating component and a second cavity accommodating a detachable second laminating component. The first cavity has a plurality of detachable locking components and one or more optical scales, and is connected to a vacuum device serving to form a vacuum state in the first cavity. The second cavity has a plurality of grooves corresponding to the locking components, and is connected to the vacuum device serving to form a vacuum state in the second cavity.

In an exemplary embodiment of the present invention, the locking components are capable of moving in the corresponding grooves to make the first cavity approach or move away from the second cavity.

In an exemplary embodiment of the present invention, the locking components are arranged in a peripheral area of the first cavity.

In an exemplary embodiment of the present invention, the one or more optical scales are arranged in a central area of the first cavity.

In an exemplary embodiment of the present invention, the curved surface lens laminating fixture is capable of performing a liquid-crystal-one-drop-filling process.

In an exemplary embodiment of the present invention, the one or more optical scales are capable of moving in the vertical direction, so that a first curved surface lens held on the first laminating component approaches or moves away from a second curved surface lens held on the second laminating component.

In an exemplary embodiment of the present invention, the first laminating component is capable of acting independently while being separated from the first cavity; the second laminating component is capable of acting independently while being separated from the second cavity.

In a second aspect of the present invention, a curved surface lens laminating system comprises one or more pre-processing units and a curved surface lens laminating fixture. The pre-processing units provide a first curved surface lens and a second curved surface lens that are processed. The curved surface lens laminating fixture comprises a first cavity accommodating a detachable first laminating component and a second cavity accommodating a detachable second laminating component. The first cavity has a plurality of detachable locking components and one or more optical scales, and is connected to a vacuum device serving to form a vacuum state in the first cavity. The second cavity has a plurality of grooves corresponding to the locking components, and is connected to the vacuum device serving to form a vacuum state in the second cavity. Additionally, the curved surface lens laminating fixture is capable of performing a liquid-crystal-one-drop-filling process.

In a third aspect of the present invention, a curved surface lens laminating system comprises one or more pre-processing units and a curved surface lens laminating fixture. The pre-processing units provide a first curved surface lens and a second curved surface lens that are processed. The curved surface lens laminating fixture comprises a first cavity accommodating a detachable first laminating component and a second cavity accommodating a detachable second laminating component. The first cavity has a plurality of detachable locking components and one or more optical scales, and is connected to a vacuum device serving to form a vacuum state in the first cavity. The second cavity has a plurality of grooves corresponding to the locking components, and is connected to the vacuum device serving to form a vacuum state in the second cavity. The curved surface lens laminating fixture is capable of performing a liquid-crystal-one-drop-filling process. Furthermore, the one or more pre-processing units respectively coat polyimide (PI) on a first optical substrate and a second optical substrate and perform an alignment process to form the first curved surface lens and the second curved surface lens.

In a fourth aspect of the present invention, a curved surface lens laminating system comprises one or more pre-processing units and a curved surface lens laminating fixture. The pre-processing units provide a first curved surface lens and a second curved surface lens that are processed. The curved surface lens laminating fixture comprises a first cavity accommodating a detachable first laminating component and a second cavity accommodating a detachable second laminating component. The first cavity has a plurality of detachable locking components and one or more optical scales, and is connected to a vacuum device serving to form a vacuum state in the first cavity. The second cavity has a plurality of grooves corresponding to the locking components, and is connected to the vacuum device serving to form a vacuum state in the second cavity. The curved surface lens laminating fixture is capable of performing a liquid-crystal-one-drop-filling process. The one or more pre-processing units respectively coat polyimide (PI) on a first optical substrate and a second optical substrate and perform an alignment process to form the first curved surface lens and the second curved surface lens. In addition, the locking components are capable of moving in the corresponding grooves to make the first cavity approach or move away from the second cavity. The locking components are arranged in a peripheral area of the first cavity. The one or more optical scales are arranged in a central area of the first cavity. The one or more optical scales are capable of moving in the vertical direction, so that a first curved surface lens held on the first laminating component approaches or moves away from a second curved surface lens held on the second laminating component. The first laminating component is capable of acting independently while being separated from the first cavity. The second laminating component is capable of acting independently while being separated from the second cavity.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A curved surface lens laminating system, comprising:
one or more pre-processing units, providing a first curved surface lens and a second curved surface lens that are processed; and
a curved surface lens laminating fixture, comprising:
a first cavity accommodating a detachable first laminating component, wherein the first cavity has a plurality of detachable locking components and one or more optical scales, each of the plurality of detachable locking components extends from outside of the first cavity toward inside of the first cavity to form a protrusion, and the first cavity is connected to a vacuum device serving to form a vacuum state in the first cavity; and
a second cavity accommodating a detachable second laminating component, wherein the second cavity has a plurality of grooves, each of the plurality of grooves corresponds to the protrusion of a respective one of the plurality of detachable locking components, and the second cavity is connected to the vacuum device serving to form a vacuum state in the second cavity;

wherein the curved surface lens laminating fixture is capable of performing a liquid-crystal-one-drop-filling process.

2. The curved surface lens laminating system as claimed in claim 1, wherein the one or more pre-processing units respectively coat polyimide (PI) on a first optical substrate and a second optical substrate and perform an alignment process to form the first curved surface lens and the second curved surface lens.

3. A curved surface lens laminating system, comprising:
one or more pre-processing units, providing a first curved surface lens and a second curved surface lens that are processed; and
a curved surface lens laminating fixture, comprising:
a first cavity accommodating a detachable first laminating component, wherein the first cavity has a plurality of detachable locking components and one or more optical scales, each of the plurality of detachable locking components extends from outside of the first cavity toward inside of the first cavity to form a protrusion, and the first cavity is connected to a vacuum device serving to form a vacuum state in the first cavity; and
a second cavity accommodating a detachable second laminating component, wherein the second cavity has a plurality of grooves, each of the plurality of grooves corresponds to the protrusion of a respective one of the plurality of detachable locking components, and the second cavity is connected to the vacuum device serving to form a vacuum state in the second cavity;
wherein the curved surface lens laminating fixture is capable of performing a liquid-crystal-one-drop-filling process;
wherein the one or more pre-processing units respectively coat polyimide (PI) on a first optical substrate and a second optical substrate and perform an alignment process to form the first curved surface lens and the second curved surface lens;
wherein the locking components are capable of moving in the corresponding grooves to make the first cavity approach or move away from the second cavity;
wherein the locking components are arranged in a peripheral area of the first cavity;
wherein the one or more optical scales are arranged in a central area of the first cavity;
wherein the one or more optical scales are capable of moving in the vertical direction, so that a first curved surface lens held on the first laminating component approaches or moves away from a second curved surface lens held on the second laminating component;
wherein the first laminating component is capable of acting independently while being separated from the first cavity; the second laminating component is capable of acting independently while being separated from the second cavity.

* * * * *